June 28, 1966 P. E. HOWARD 3,258,701
PHASE DETECTOR USING AN ACTIVE TRANSISTOR POWERED
SOLELY BY INPUT SIGNAL
Filed Aug. 14, 1963
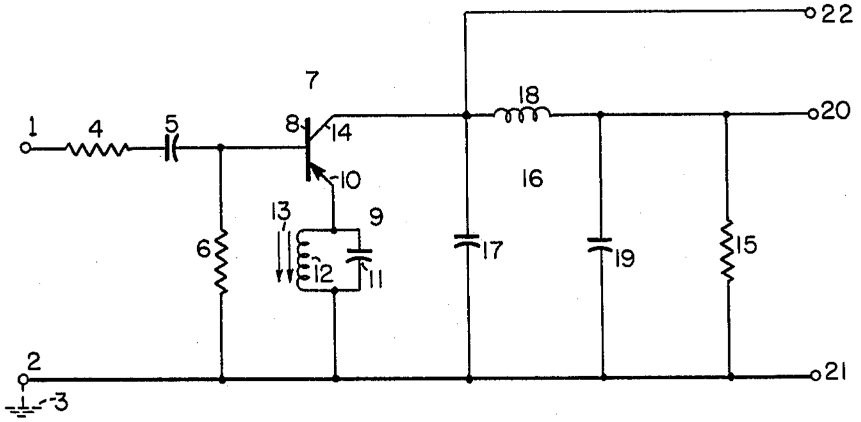
INVENTOR.
PAUL E. HOWARD
BY Harry R. Lubcke
AGENT

United States Patent Office 3,258,701
Patented June 28, 1966

3,258,701

PHASE DETECTOR USING AN ACTIVE TRANSISTOR POWERED SOLELY BY INPUT SIGNAL

Paul E. Howard, Los Angeles, Calif., assignor to Tamar Electronics, Inc., Anaheim, Calif., a corporation of California Filed Aug. 14, 1963, Ser. No. 302,188
3 Claims. (Cl. 329—103)

My invention relates to phase detectors and particularly to one in which an unbalanced network produces a balanced electrical output.

The known ratio detector, discriminator and like devices frequently employed for producing an amplitude response to a change in frequency of alternating electrical energy is a balanced device. Balanced radio frequency (or intermediate frequency) input circuits, such as center-tapped transformers or coils, are invariably employed along with two diode elements connected to the extremities of the center-tapped element. Devices of this class are used to demodulate frequency-modulated signals.

The novel device described herein is a true phase detector in which one transistor is employed in connection with a single parallel resonant circuit. Although the circuit of this device is unbalanced with respect to signal ground it performs in a fully balanced manner insofar as detecting phase. Such detection also includes demodulation of frequency-modulated signals.

A source of energizing electrical energy, such as a battery, is not required. The incoming signal itself provides forward biases on both junctions of the transistor. A low pass filter may be provided in the output circuit of the detector to remove radio frequency energy from that circuit. However, this is not required if the presence of such energy is inconsequential.

An object of my invention is to provide a simple phase detector.

Another object is to provide a phase detector having unbalanced elements.

Another object is to provide a phase detector employing one transistor.

Another object is to provide a phase detector employing one single-coil resonant circuit.

Other objects will become apparent upon reading the following detailed specification and upon examining the accompanying drawing, in which is set forth by way of illustration and example an embodiment of my invention.

The single figure shows the schematic diagram of my invention.

In the single figure numeral 1 indicates an input terminal. This is typically connected to the output of an intermediate frequency amplifier, a radio frequency amplifier or a limiter, which devices are known. Terminal 2 represents the signal ground terminal, which may or may not be connected to a conventional ground 3, shown dotted. Resistor 4 and capacitor 5 from a decoupling network, which is employed for the purpose of isolating the phase detector from preceding equipment, such as has been mentioned.

In a typical case where the input is a frequency-modulated signal of 1.6 megacycle (mc.) center frequency, the resistor may have a resistance of the order of one hundred ohms and the capacitor a capacitance of 5,000 picofarads (1 pf.=1 $\mu\mu$fd.). Shunt resistor 6, connected between capacitor 5 and signal ground 2, provides a conductive input circuit for the detector. It may have a resistance of the order of 8,000 ohms.

Transistor 7 may be of the usual PNP type, of which the germanium 2N2188 is illustrative. It is desirable that the distributed capacitance of the base 8 thereof be small and in the transistor specified this is so. A small capacitance here prevents changes in the equivalent capacitance across parallel resonant circuit 9 and thus prevents detuning this resonant circuit with changes in signal level.

Parallel resonant circuit 9 is connected between emitter 10 and transistor 7 and signal ground 2. The resonant circuit is comprised of capacitor 11 and inductor 12, the latter having an adjustable powdered iron core 13 in a typical embodiment. To resonate to the 1.6 mc. incoming frequency previously considered, capacitor 11 has a capacitance of 68 pf. and inductor 12 an inductance having a range of from 100 to 160 microhenries ($\mu$h.). In operation, the resonant circuit 9 is tuned to the incoming frequency; it is not tuned to one side of this frequency so as to function as a slope detector.

Collector 14 of transistor 7, in combination with resistor 15, forms the basic output circuit of the phase detector and represents all that is required if the presence of incoming frequency in the output circuit is not considered detrimental. For reasons of making measurements and for freedom from possible overall circuit instability, however, it is advisable to provide a low pass filter 16 between collector 14 and output resistor 15. For the exemplary frequency previously considered the cut-off frequency of this filter may be of the order of one megacycle; i.e., any cut-off frequency reasonably less than the signal frequency and reasonably greater than the highest modulation frequency.

First capacitor 17 connects from collector 14 to signal ground 2 and may have a capacitance of the order of 800 pf. Inductor 18 connects in series between collector 14 and the otherwise adjacent terminal of resistor 15. An inductance of the order of 7 millihenries is suitable. Second capacitor 19 connects from the junction between inductor 18 and resistor to signal ground 2 and typically has the same capacitance as capacitor 17; i.e., 800 pf.

An output terminal 20 connects to the junction between inductor 18 and resistor 15. A typical resistance value for the latter is 12,000 ohms. Output terminal 21 connects to signal ground terminal 2. The output load impedance should be relatively high, of the order of fifty thousand ohms, but this provides exemplary linearity over a relatively wide frequency swing of the modulated input signal. A direct current output terminal 22 connects to collector 14.

This phase modulator became possible when I determined that the base-emitter junction of a transistor can be forward biased by an incoming alternating current signal and that this junction will then function as a diode. Further, when the transistor is so operating, there will also be generated a forward bias at the collector-base junction (as long as there is a conductive path in the collector-output circuit, such as resistor 15). The collector-base bias will be smaller than the emitter-base bias, since there is no source of static power available (i.e., a battery) in the way I operate the phase modulator.

The important point is, of course, that the transistor does not operate in the usual manner, but does operate as two junction diodes with a common base.

As to the operation for phase detection, consider the conditions when the frequency of the incoming signal is the same as the resonant frequency of resonant circuit 9. The signal applied to the emitter 10 is then the same amplitude as that applied to the base 8 and so the average voltage developed at the collector 14 is zero.

When, due to frequency modulation or for any other reason, the input signal has a frequency lower than the frequency of resonance of resonant circuit 9, a positive current will flow in load resistor 15. Similarly, when the input signal has a frequency higher than the frequency of resonance of resonant circuit 9 a negative current will flow in load resistor 15. Thus, a change in amplitude of current through the load is obtained in response to a change in frequency. This is the performance of a true phase detector and this has been accomplished with simple unbalanced circuit elements.

An NPN instead of a PNP transistor may be employed for transistor 7, in which case the polarities of the currents set forth above are reversed.

It is seen that the resting frequency of operation of the phase detector is determined by the frequency of resonance selected for resonant circuit 9. This may have almost any value, limited only by secondary effects, such as distributed capacitance of elements at high frequencies, etc. With the apparatus set forth in the illustrative example the frequency of operation can be varied over a number of megacycles by merely adjusting tuning core 13. In this way it is possible to easily and quickly accommodate any incoming signal frequency and one is not limited to one or two fixed frequencies often employed with ratio detectors and similar devices.

In addition to phase detection, a considerable degree of amplitude limiting is provided with this phase detector. The limiting level is set by the base-emitter conduction level.

The phase detector circuit will operate over a wide range of circuit values and with many such values it will operate at substantially maximum efficiency. It will be noted that resistor 6, and to a very limited degree the impedance existing across any generator connected to terminals 1 and 2, are connected across parallel resonant circuit 9. These tend to reduce the "Q" of the resonant circuit. With a lower Q the current change in output resistor 15 is reduced for a given frequency deviation of the incoming signal. Normally, it is desired that the current change be relatively large, thus the value of resistor 6, etc. should be high rather than low. On the other hand, when a broad band frequency response is desired this can be easily obtained by a low value of resistor 6.

Simultaneous observations of the direct current balance is possible at terminal 22 by using a high impedance monitor, such as an oscilloscope (with D.C. provision) or by using a D.C. vacuum tube voltmeter. Theoretically, zero currents would occur at zero phase angle to the input signal to which parallel resonant circuit 9 is tuned. However, since no inductance-capacitance network has infinite Q in practice, there is always a small finite difference between the frequency to which the resonant circuit is tuned and the frequency at which the direct current is minimum.

Although specific examples of frequency and values for the circuit elements have been given in this specification, it is to be understood that these are by way of example only and that departures may be taken from them without departing from the inventive concept. Also, certain equivalent elements may be substitutionally employed and filter 16 may be omitted.

Having thus fully described my invention and the manner in which it is to be practiced, I claim:

1. A phase detector comprising;
(a) a junction transistor having a base, an emitter and a collector,
(b) a conductive, resistive input circuit including only one parallel resonant circuit tuned to the radio frequency of an incoming signal,
said resonant circuit connected directly to said emitter and to one input terminal of said input circuit,
to provide a forward bias on the base-emitter junction of said transistor when a signal flows through said base-emitter junction,
(c) a resistor in parallel with said parallel resonant circuit and said base-emitter junction, (d) input coupling means to produce across said resistor a radio frequency voltage proportional to the amplitude of the radio frequency energy of said signal, and
(e) a conductive output circuit unresponsive to the radio frequency of said signal,
to provide a forward bias on the collector-base junction of said transistor when said signal flows through said collector-base junction;
the forward bias of said collector-base junction being less than the forward bias of said base-emitter junction.

2. A phase detector comprising;
(a) a junction transistor having a base, an emitter and a collector,
(b) a conductive, resistive input circuit including only one parallel resonant circuit tuned to the radio frequency of an incoming signal,
said resonant circuit connected directly to said emitter and to one input terminal of said input circuit,
to provide a forward bias on the base-emitter junction of said transistor when a signal flows through said base-emitter junction,
(c) a decoupling circuit connected to said base having only resistive and capacitive elements
for introducing said signal to said phase detector, and
(d) a conductive output circuit unresponsive to the radio frequency of said signal,
to provide a forward bias on the collector-base junction of said transistor when said signal flows through said collector-base junction;
the forward bias of said collector-base junction being less than the forward bias of said base-emitter junction.

3. A phase detector having elements unbalanced with respect to ground for demodulating a frequency-modulated signal, comprising;
(a) a transistor having a base, an emitter and a collector,
(b) a single parallel resonant circuit resonant to said frequency-modulated signal,
said resonant circuit connected to said emitter and to ground,
(c) only a resistive impedance connected exclusively between said base and said ground,
(d) a low pass filter having an input and an output, said input conductively connected to said collector and to said ground
to attenuate said frequency-modulated signal while passing the demodulated component of said frequency-modulated signal, and
(e) a load impedance connected directly to said output of said low pass filter.

References Cited by the Examiner

UNITED STATES PATENTS

| | | | |
|---|---|---|---|
| 2,891,156 | 6/1959 | Crow | 329—103 |
| 2,976,409 | 3/1961 | Loughlin | 307—88.5 |
| 3,030,585 | 4/1962 | Meth | 329—103 |
| 3,054,969 | 9/1962 | Harrison | 330—31 X |

OTHER REFERENCES

Bevitt: Transistors Handbook, Prentice-Hall, New Jersey, 1956, TK 7872 T 73B48, pages 290, 291.

HERMAN KARL SAALBACH, *Primary Examiner.*

P. L. GENSLER, *Assistant Examiner.*